Patented May 27, 1947

2,421,217

UNITED STATES PATENT OFFICE 2,421,217

READY-TO-EAT FOOD PRODUCT

William P. Penty, Battle Creek, Mich., assignor to Kellogg Company, Battle Creek, Mich., a corporation of Delaware No Drawing. Application October 28, 1943, Serial No. 508,059

5 Claims. (Cl. 99—83)

This invention relates to a novel ready-to-eat cereal or breakfast food composition and is a continuation-in-part of my co-pending application Serial No. 490,460, filed June 11, 1943, which in turn is a continuation-in-part of my application Serial No. 449,874, filed July 6, 1942, and Serial No. 420,651, filed November 27, 1941.

In general the present invention relates to a cooked, ready-to-eat cereal composition of the shredded, puffed, crumbled, biscuit, granule, and the like type breakfast food which is readily digestible, highly palatable and of pleasing taste, of high nutritive value, and particularly of high protein content, by combining two plant protein materials, one of which has a high starch but low protein content, and the other a high protein but low carbohydrate content, so as to complement each other, even though each alone has been found to be obnoxious to the occidental palate.

More specifically the present invention relates to a highly palatable and nutritious ready-to-eat breakfast cereal composed of a combination of yellow corn and soya bean.

Yellow corn, which is high in kryptoxanthine, the essential provitamin A, and although available in unlimited quantities without treatment has never been successfully utilized in the form of a ready-to-eat breakfast cereal acceptable to the general public. Soya bean although possessing exceptionally high nutritive value because of its high protein content characterized by large proportions of essential amino acids, has likewise heretofore never been successfully utilized in the form of a desirable ready-to-eat breakfast cereal product. The reason for this is that each of these materials contains obnoxious principles which the usual processing procedures heretofore recognized in the art do not remove to an extent where either alone is fully acceptable.

The present invention provides a novel combination of these two incompatibles in the form of a highly palatable product, wherein they are associated in what I believe to be a physical-chemical relationship as distinguished from the well known principle of merely a mixture whereby the undesirable qualities of one or the other are partially masked.

I have found that the most palatable product is formed when these materials are combined in the proportion of approximately three parts by weight of yellow corn to one part by weight of the soya bean material. However, in general, good products may be formed by combining from about 20 to about 30 per cent by weight of the soya material with from about 80 to about 70 per cent by weight yellow corn in the composite product.

In producing the product of my invention I prefer to use what is hereinafter referred to as "de-fatted soya bean particles." This term is intended to include soya bean grits, meal or flakes which have been treated previous to use in my process so as to have a fat or oil content of less than about 1½ per cent, and preferably less than 0.75 per cent, and generally resulting from solvent extraction treatment of soya beans. Use of soya de-fatted to such extent is necessary to insure good keeping qualities of the final product, and to permit proper processing. It will be understood that in this condition the de-fatted soya bean particles have already been subjected to at least limited cooking or heat treatment as a result of distillation followed by steaming for removal of the solvent, and may have been subjected to additional moisture conditioning treatment for the alleged purpose of "de-bittering." However, even in the latter condition the characteristic objectionable soya bean taste or flavor persists. The de-fatted soya bean particles which I employ, preferably have a moisture content of from about 10 to about 12 per cent.

The yellow corn is preferably employed in the form of grits having likewise a moisture content of from about 10 to about 12 per cent. For the production of certain forms of my product a graded size such as numbers 6–7–8 may be used. Larger size particles such as number 4 may be used with longer cooking time and conversely more finely ground material may be used with relatively shorter cooking time.

In the production of my novel yellow corn-soya bean composite food product I may employ various general procedures for the production of cooked, ready-to-eat, breakfast food cereal products, depending upon the desired form, type or condition of the final product, all of which comprise intimate admixture and distribution of the two components, joint cooking and final toasting. If the materials are cooked together in the form of grits or relatively large particles they are subsequently subjected to masticating or compacting action, such as by shredding apparatus, to more uniformly spread, mix and cohere the components and to bring them not only into intimate physical association, but to enable what I believe to be the taking place of further chemical reaction, and to retain such relationship throughout the subsequent process steps, such as heat drying, tempering and toasting. On the other hand if the two components are first reduced to relatively small or fine particles and intimately admixed with each other and with water into the form of a dough and so cooked, no further mixing, mastication, shredding or the like is required, other than sizing or shaping, before final drying and toasting.

In the production of my product by such processes due regard should be had of the diverse properties of the high starch, low protein containing yellow corn and the high protein, low carbohydrate content of soya. For example, in the production of certain products it is desirable to discharge the cook from the steam cooker at a restricted moisture content such as about 35–40%. This requires cooking of corn grits for a relatively long period with a restricted amount of water, although full joint cooking of soya bean grits therewith under such conditions would cause undesirable huminification of the latter with resultant darkening by hydrolysis of the protein. For such purpose I suitably employ a two stage process wherein the corn is first cooked alone, the cooking interrupted and the soya introduced and the two further jointly cooked. In the production of certain other products wherein relatively larger proportions of water are or can be employed for cooking both of the components and wherein the components are in the forms of relatively small size grits or fine particles and thus permit of the use of relatively shorter cooking periods, the two components may be mixed in the form of a dough and jointly cooked in a single stage process, the corn dough further protecting the soya from becoming huminified.

The following examples are introduced for the purpose of illustrating several methods for producing the product of my invention in different forms, types or styles, although it will be understood that they are not given with the intention of unduly limiting the generally broad scope of my invention.

*Example I*

75 pounds of graded Nos. 6–7–8 yellow corn grits were cooked with about 3¼ gallons of flavoring solution comprising water, 8 per cent sugar, 3½ per cent salt and a small percentage of malt extract, the cooking taking place for a period of about one hour and ten minutes in a steam cooker, the pressure being maintained at about 20 pounds per square inch steam pressure, the cook being briskly agitated for about the first 20 minutes of the cooking period, and subsequently mildly agitated. The cooker was then opened and 25 pounds of medium ground or 10 mesh de-fatted soya bean flakes which had previously been tempered with one gallon of a flavoring solution similar to that hereinbefore described, was introduced into the cooker and the yellow corn and soya grits were cooked together and briskly agitated for a period of about 20 minutes, the steam pressure being maintained at about 20 pounds per square inch.

The cook was then removed from the cooker at a moisture content of about 37% in the form of discrete but soft and pliable particles of yellow corn having particles of soya adhered thereto, the starches of the corn being hydrolized and highly dextrinized and the particles superficially gelatinized with no free starch or white center and the soya particles in a softened partially cooked condition. The mass was then dried in a vat drier by passing cold air into it for about 3 minutes and then air at about 130° F., for about 13 minutes, the mass being then permitted to cool for an additional 2 minutes. The moisture content of the mass at this stage was found to be about 31 per cent. The mass was then permitted to temper in a tempering tank at room temperature for about 35 minutes to cause uniform dispersion of its moisture content. The tempered mass was then shredded in a conventional shredding mill which serves to further mix, spread and weld the particles. The shreds were then cut into about 1 to 2 inch lengths and dried in a rotary oven, pickers or vanes being employed in the oven to separate the shreds so as to prevent them from becoming doughy or lumpy. The cut shreds were then dried in a flight drier, air being passed into contact therewith at about 140° F., for about 25 minutes to reduce the moisture content to about 10 per cent, and then toasted in an oven at a temperature of about 470° F., for about 25 to 30 seconds until brown and slightly puffed.

The composite cereal product formed in accordance with the foregoing process produced crisp elongated shreds of a golden brown color with a slightly puffed or blistered appearance and which were of relatively light weight, that is of greatly increased bulk per unit weight relative to the original components. When eaten with milk or cream the product was highly palatable and tender and devoid of the objectionable characteristic taste of yellow corn or soya beans, and of enhanced protein content as well as minerals such as calcium and iron.

*Example II*

Three pounds of yellow corn grits ground to pass through a 32 mesh screen, and one pound of 10 mesh de-fatted soya bean flakes was likewise ground to pass a 32 mesh screen. The two were mixed to make up a four pound batch composed of 75% by weight of yellow corn and 25% by weight of soya bean. To this batch there was then added 1¾ quarts of flavoring solution similar to that of the previous example; and the whole mixed into a stiff dough. This dough was placed into a steam cooker and cooked for 40 minutes at 20 pounds per square inch steam pressure. The cooked mass was then removed at a moisture content of 42% and dried at a temperature of 140° F., to a moisture content of 15.5%, and then permitted to temper for 16 hours at room temperature. The material was then ground to granules and screened to size, and the granules toasted in an oven at a temperature of 400° F., to a golden color.

The product was a hard, granular "Grape-Nut" type product, and when eaten with milk or cream was highly palatable and without discernible objectionable beany or yellow corn taste.

*Example III*

36.25 pounds of graded Nos. 5, 6 and 7 yellow corn grits were bumped thin and together with 13.75 pounds of 10 mesh defatted soya flakes were mixed into a dough with the aid of 3¾ gallons of flavoring solution, similar to that of the preceding examples. The dough was then placed into a steam cooker and cooked for 50 minutes at a steam pressure of 20 pounds per square inch. The mass was then removed from the cooker at a moisture content of 54%, dried at a temperature of 130° F., to a moisture content of about 31% and then permitted to temper at room temperature for 16 hours. The material was then shredded in a shredding mill at a moisture content of about 30% and the shreds compacted into the form of small biscuits. The biscuits were then toasted at a temperature of 310° F., for about 4½ minutes to a golden brown color.

The product was highly palatable when eaten with milk or cream; was crisp and tender and of comparatively light weight; and was devoid of the objectionable characteristic tastes of either yellow corn or soya bean, while at the same time the food value of the composite was relatively high, the protein content being about 19 per cent.

I claim as my invention:

1. A ready-to-eat composite palatable food product of the breakfast cereal type comprising cooked, intimately associated and toasted components of de-fatted soya bean particles in amount from about 20 to about 30 percent by weight and yellow corn particles in amount from about 70 to 80 percent by weight, said components initially having individually inherent palatably objectionable characteristics, said components being inseparably cohered in a substantially uniformly finely divided homogeneous composite condition and substantially devoid of the initial inherent palatably objectionable characteristics.

2. A ready-to-eat composite palatable food product of the breakfast cereal type comprising cooked, intimately associated and toasted components of approximately 25 percent by weight of de-fatted soya bean particles and approximately 75 percent by weight of yellow corn particles, said components initially having individually inherent palatably objectionable characteristics, said components being inseparably cohered in a substantially uniformly finely divided homogeneous composite condition and substantially devoid of the initial inherent palatably objectionable characteristics.

3. A ready-to-eat composite palatable food product of the breakfast cereal type comprising cooked, intimately associated and toasted components of de-fatted soya bean particles and yellow corn particles, the soya being in the proportion of about one-third by weight of the corn, said components initially having individually inherent palatably objectionable characteristics, said components being inseparably cohered in a substantially uniformly finely divided homogeneous composite condition and substantially devoid of the initial inherent palatably objectionable characteristics.

4. A ready-to-eat composite palatable food product of the breakfast cereal type comprising cooked, intimately associated and toasted components of de-fatted soya bean particles in amount from about 20 to about 30 percent by weight and yellow corn particles in amount from about 70 to about 80 percent by weight, said components initially having individually inherent palatably objectionable characteristics, said components being inseparably cohered in a substantially uniformly finely divided homogeneous composite condition and substantially devoid of the initial inherent palatably objectionable characteristics, and in the form of crisp elongated shreds of golden brown color with a slightly puffed appearance and greatly increased bulk per unit weight relative to the bulk of the original components.

5. A ready-to-eat composite palatable food product of the breakfast cereal type containing cooked, intimately associated and toasted components of de-fatted soya bean particles in amount from about 20 to about 30 percent by weight and yellow corn grits in amount from about 70 to 80 percent by weight, said components initially having individually inherent palatably objectionable characteristics, said components being in intimate association and inseparably cohered in a substantially uniformly finely divided homogeneous shredded composite condition and substantially devoid of the initial inherent palatably objectionable characteristics.

WILLIAM P. PENTY.

REFERENCES CITED

The following references are of record in the file of this patent:

UNITED STATES PATENTS

| Number | Name | Date |
|---|---|---|
| 1,430,670 | Morgan | Oct. 3, 1922 |
| 2,182,175 | Gates | Dec. 5, 1939 |
| 2,130,087 | Hasbrouk | Sept. 13, 1938 |
| 1,260,656 | Bollman | Mar. 26, 1918 |
| 2,260,254 | Kruse | Oct. 21, 1941 |
| 1,388,873 | McKay | Aug. 30, 1921 |
| 2,093,260 | Wilder | Sept. 14, 1937 |
| 2,264,574 | Kellogg | Dec. 2, 1941 |